(12) United States Patent
Zhu (10) Patent No.: US 12,073,252 B2
(45) Date of Patent: Aug. 27, 2024

(54) ALLOCATION OF PROCESSING COMPUTERS BASED ON PRIORITY LISTS

(71) Applicant: Kabushiki Kaisha Toshiba, Tokyo (JP)

(72) Inventor: Ziming Zhu, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 594 days.

(21) Appl. No.: 17/238,694

(22) Filed: Apr. 23, 2021

(65) Prior Publication Data
US 2022/0342711 A1 Oct. 27, 2022

(51) Int. Cl.
*G06F 9/50* (2006.01)
*G06F 9/48* (2006.01)

(52) U.S. Cl.
CPC .......... *G06F 9/5027* (2013.01); *G06F 9/4843* (2013.01); *G06F 2209/5021* (2013.01)

(58) Field of Classification Search
CPC ................ G06F 9/5027; G06F 9/4843; G06F 2209/5021
See application file for complete search history.

(56) References Cited

U.S. PATENT DOCUMENTS

2020/0026264 A1  1/2020  Zhu et al.

FOREIGN PATENT DOCUMENTS

| CN | 105786622 A | 7/2016 | |
|---|---|---|---|
| CN | 110098969 A | 8/2019 | |
| CN | 111596868 A | * 8/2020 | |
| EP | 2677830 A1 | * 12/2013 | ............ H04W 28/16 |
| JP | 2011170679 A | * 9/2011 | |

OTHER PUBLICATIONS

Chen et al. CN111596868A Description Translation, 2020-08-28, [database online], [retrieved on Sep. 28, 2023] Retrieved from Espacenet using Internet <URL:https://worldwide.espacenet.com/publicationDetails/description?CC=CN&NR=111596868A&KC=A&FT=D&ND=3&date=20200828&DB=&locale=en_EP>, pp. 1-18 (Year: 2020).*

Sato, JP2011170679A Description Translation, Sep. 1, 2011, [database online], [retrieved on Sep. 28, 2023] Retrieved from Espacenet using Internet <URL:https://worldwide.espacenet.com/publicationDetails/description?CC=JP&NR=2011170679A&KC=A&FT=D&ND=3&date=20110901&DB=&locale=en_EP>, pp. 1-26 (Year: 2011).*

Dou et al. CN105786622A Description Translation, Jul. 20, 2016, [retrieved on Sep. 28, 2023] Retrieved from WIPO Patenscope using Internet <URL:https://patentscope.wipo.int/search/en/detail.jsf?docId=CN175951619&_cid=P11-LNOTR1-63429-1>, pp. 1-5 (Year: 2016).*

* cited by examiner

*Primary Examiner* — Meng Ai T An
*Assistant Examiner* — Hsing Chun Lin
(74) *Attorney, Agent, or Firm* — Oblon, McClelland, Maier & Neustadt, L.L.P.

(57) ABSTRACT

Allocation of computational resource to requested tasks is achieved by running a scheduling operation across a plurality of schedulers, each in communication with a subset of network entities, the schedulers establishing a virtual bus. In certain embodiments, the scheduling operation is able to run continuously, allocating newly arriving task requests as resources become available.

6 Claims, 6 Drawing Sheets

ALLOCATION OF PROCESSING COMPUTERS BASED ON PRIORITY LISTS

FIELD

The present disclosure is in the field of computing. Specifically, it relates to the allocation of tasks to computational resource in a heterogeneous computer network.

DESCRIPTION OF EMBODIMENTS

Cloud computing is a term used to denote any form of computing making use of a remote computing resource. The remote computing resource may comprise one computer, or a plurality of computers in network with each other.

Parallel processing and edge computing are two frameworks which enable computing tasks to be performed in an efficient manner. Parallel processing provides the ability to process multiple tasks at the same time using a number of computing processors, while edge computing allows computing tasks to run using available local resources rather than a centralised cloud.

Combining parallel processing with edge computing offers an opportunity to implement fast and massive local data processing, which can bring benefits such as low processing latency, reduced data traffic in a core communication network, and enhanced data privacy.

One important issue is how to efficiently allocate available local computational resources to meet demand. One approach is to allocate tasks to local computational resources at random. While this approach is simple to implement, it exhibits low efficiency and does not provide quality of service (QoS). On the other hand, allocating tasks to computational resources using a centralized optimisation based scheduling method will usually be complicated, and can involve operational overhead which can easily outweigh the benefit of a more considered approach to task/resource allocation.

Embodiments disclosed herein implement a matching algorithm to achieve an effective allocation of local computational resources to meet user requirements. Embodiments use a virtual entity for collecting the user requirement, establish preference lists, and conduct a 'proposing' process. Embodiments produce a matching process with advantageously reduced complexity.

In disclosed embodiments, matching is enabled by a virtual entity, for example, a software program coordinating available computing resources, which may be implemented in a distributed manner across multiple nodes using a virtual data bus.

The virtual scheduler may act as if it were centrally deployed, but with the advantage of not requiring a single scheduling point which could present a bottleneck and critical point of failure.

The virtual entity may be considered as a plurality of interconnected schedulers interposing between user computers demanding computational resources, and edge computers which provide computational resources to meet demand.

In an embodiment, the virtual entity, comprising interconnected schedulers, collects the task processing requirements of the users separately, and constructs preference lists for the users. Thus, in practical implementations, the task processing requirements may be collected by interconnected schedulers and information gathered on such task processing requirements may be synchronised between the interconnected schedulers using a virtual data bus as noted above. A matching process on the synchronised information, to establish the allocation of the computing tasks (users) to the computational resources. Allocation of a task to a computing resource is established through the scheduler (which may be considered as a signalling and control plane) and the actual computing tasks are performed by the computing units (which may be considered as a data plane).

Figure 1:
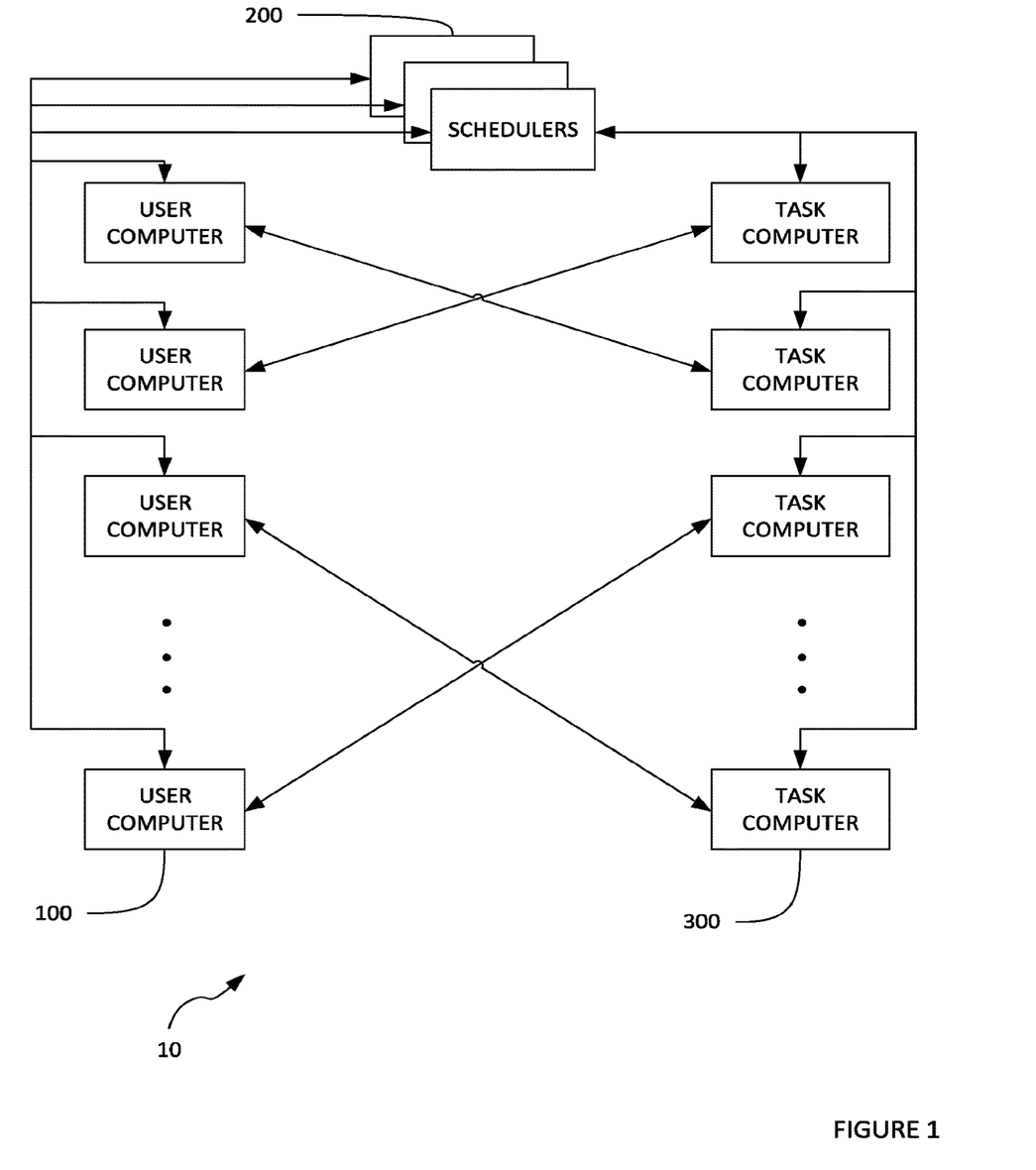
FIG. 1 is a schematic diagram of a general arrangement of computers in accordance with an embodiment.

As FIG. 1 shows, a plurality of user computers 100 are networked with a plurality of task computers 300, and active network links are made between the user computers 100 and the task computers 300 by schedulers 200 by way of a matching process to be described below. A user computer 100 that requires a task to be performed by a task computer 300 can obtain access to computational resource from task computers 300 on the basis of the matching process performed at the schedulers 200.

Each of the illustrated computers is a general purpose computer of conventional construction. The computers host executable program instructions to enable the performance of the matching process, to cause allocation at the schedulers 200 of tasks requested by a user computer 100 to be performed by a task computer 300.

Figure 2:
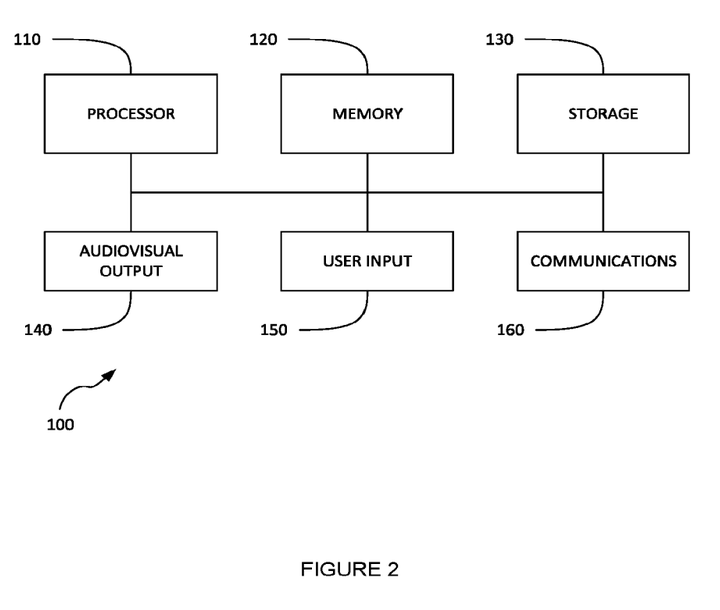
FIG. 2 is a schematic architecture of a user computer of FIG. 1.

So, as shown in FIG. 2, the user computer 100 comprises a processor 110, a memory 120 for short term retention of processing data, and storage 130 for long term (but potentially slow retrieval) storage of program, processing and informational data. In conventional implementations, the storage 130 may comprise a magnetic drive, or a solid-state storage device. An audio-visual output facility 140 is provided, such as a visual display unit and speakers, for display and audio output to a user, and a user input device 150, such as a keyboard, pointing device (e.g. mouse) and microphone are provided to enable user input action to the user computer 100. A communications facility 160 provides connection to other computers, such as by Ethernet connection.

The user computer 100 stores and executes a user computer task execution request program, which enables the user computer 100 to request a task to be performed by a task computer, in accordance with a matching process executed at the schedulers 200.

The task execution request program can be introduced to the user computer 100 by way of a download computer program product, or a storage medium computer program product; this is implementation specific.

Figure 3:
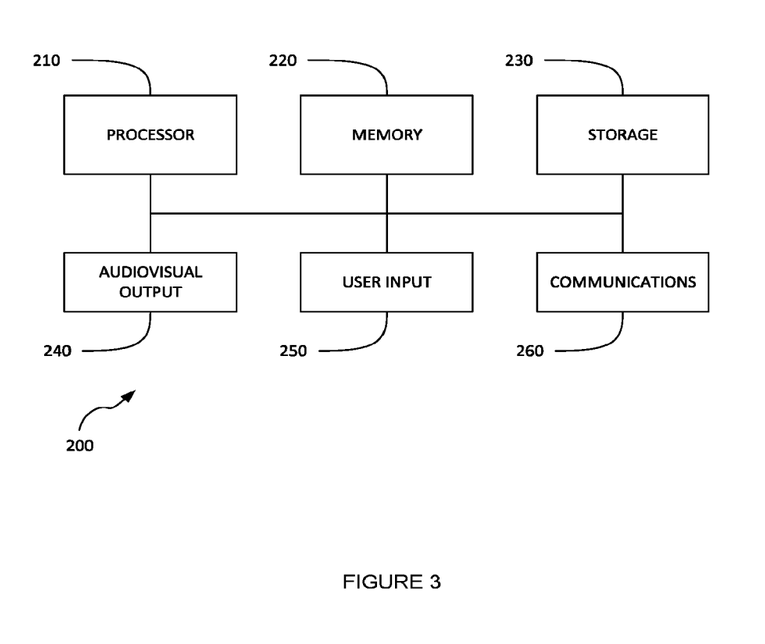
FIG. 3 is a schematic architecture of a scheduler of FIG. 1.

As shown in FIG. 3, each scheduler 200 comprises a processor 210, a memory 220 for short term retention of processing data, and storage 230 for long term (but potentially slow retrieval) storage of program, processing and informational data. In conventional implementations, the storage 230 may comprise a magnetic drive, or a solid-state storage device. An audio-visual output facility 240 is provided, such as a visual display unit and speakers, for display and audio output to a user, and a user input device 250, such as a keyboard, pointing device (e.g. mouse) and microphone are provided to enable user input action to the scheduler 200. A communications facility 260 provides connection to other computers, such as by Ethernet connection.

Each scheduler 200 stores and executes a scheduler program, which enables the scheduler 200 to manage requests issued by user computers 100 and to match them with computing facilities offered by task computers 300. The scheduler program instances are cooperative, to produce a virtual bus between the schedulers 200, so that a common decision can be taken on scheduling. The scheduler program can be introduced to the scheduler 200 by way of a download computer program product, or a storage medium computer program product; this is implementation specific.

Figure 4:
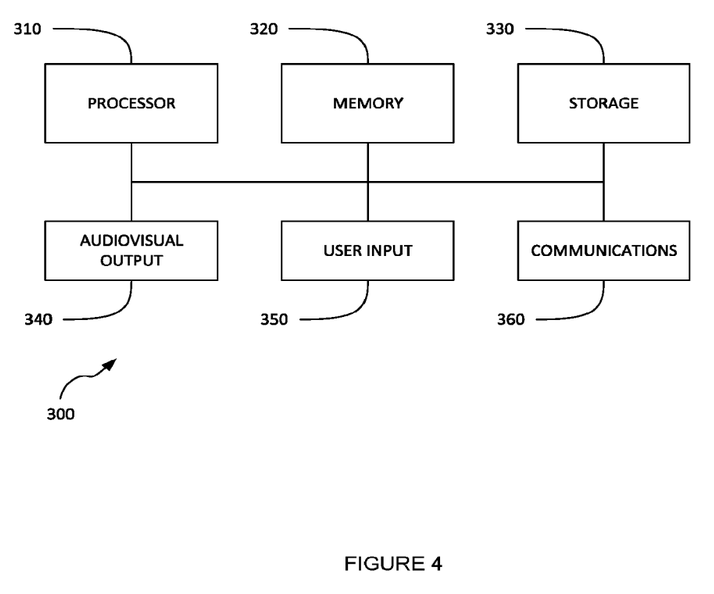
FIG. 4 is a schematic architecture of a task computer of FIG. 1.

As shown in FIG. 4, each task computer 300 comprises a processor 310, a memory 320 for short term retention of processing data, and storage 330 for long term (but potentially slow retrieval) storage of program, processing and informational data. In conventional implementations, the storage 330 may comprise a magnetic drive, or a solid-state storage device. An audio-visual output facility 340 is provided, such as a visual display unit and speakers, for display and audio output to a user, and a user input device 350, such as a keyboard, pointing device (e.g. mouse) and microphone are provided to enable user input action to the scheduler 300. A communications facility 360 provides connection to other computers, such as by Ethernet connection.

As the task computers 300 may be edge computing devices, in that they provide an interface between local computation facilities and more distributed computation facilities, other forms of computer connections may also be provided, such as internet access to wider networks such as the World Wide Web. This may enable a task computer 300, as the need arises, to recourse to other computation facilities for the performance of requested tasks.

Each task computer 300 stores and executes a task computer program, which enables the task computer 300 to offer task computation facilities to the scheduler 200 and thence to the user computers 100. This program can be introduced to the task computer 300 by way of a download computer program product, or a storage medium computer program product; this is implementation specific.

Figure 5:
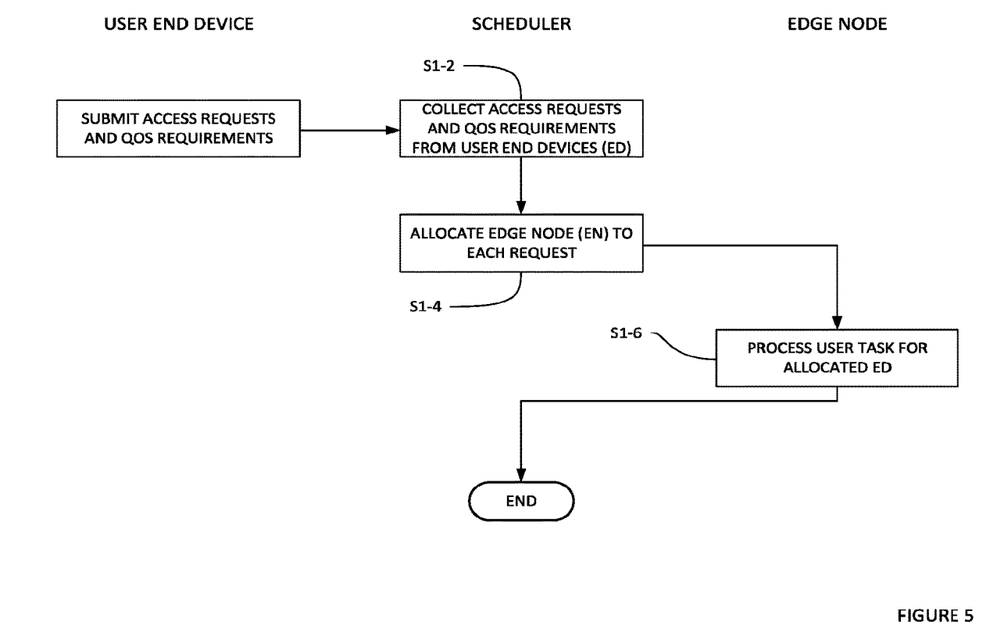
FIG. 5 is a swim-lane flow diagram of a procedure of allocating and executing tasks in accordance with an embodiment.

FIG. 5 illustrates a process of allocating resources in the illustrated system. This is depicted as a swim-lane flow diagram illustrating interaction between a nominal user computer 100, a scheduler 200 and a task computer 300. A first step S1-2 comprises collecting user requirements along with an access request, which provides the fundamental reference for establishing preference in the choices of resources.

Then, a resource allocation step S1-4 establishes a match between requested tasks and computation facilities offered by task computers 300. A principle embodied in the described allocation method is that it requires only a limited number of look up operations. This has the prospect of avoiding useless proposing and checking of proposals, to improve time efficiency of the matching process. By using a virtual scheduling entity embodied by the plurality of schedulers, the process of matching is synchronised in real time on the network, meaning that there is no delay and repeat information exchange between the matching nodes.

Once task allocation has been completed, in step S1-6, the allocated tasks are performed by allocated task computers (edge nodes, EN).

Figure 6:
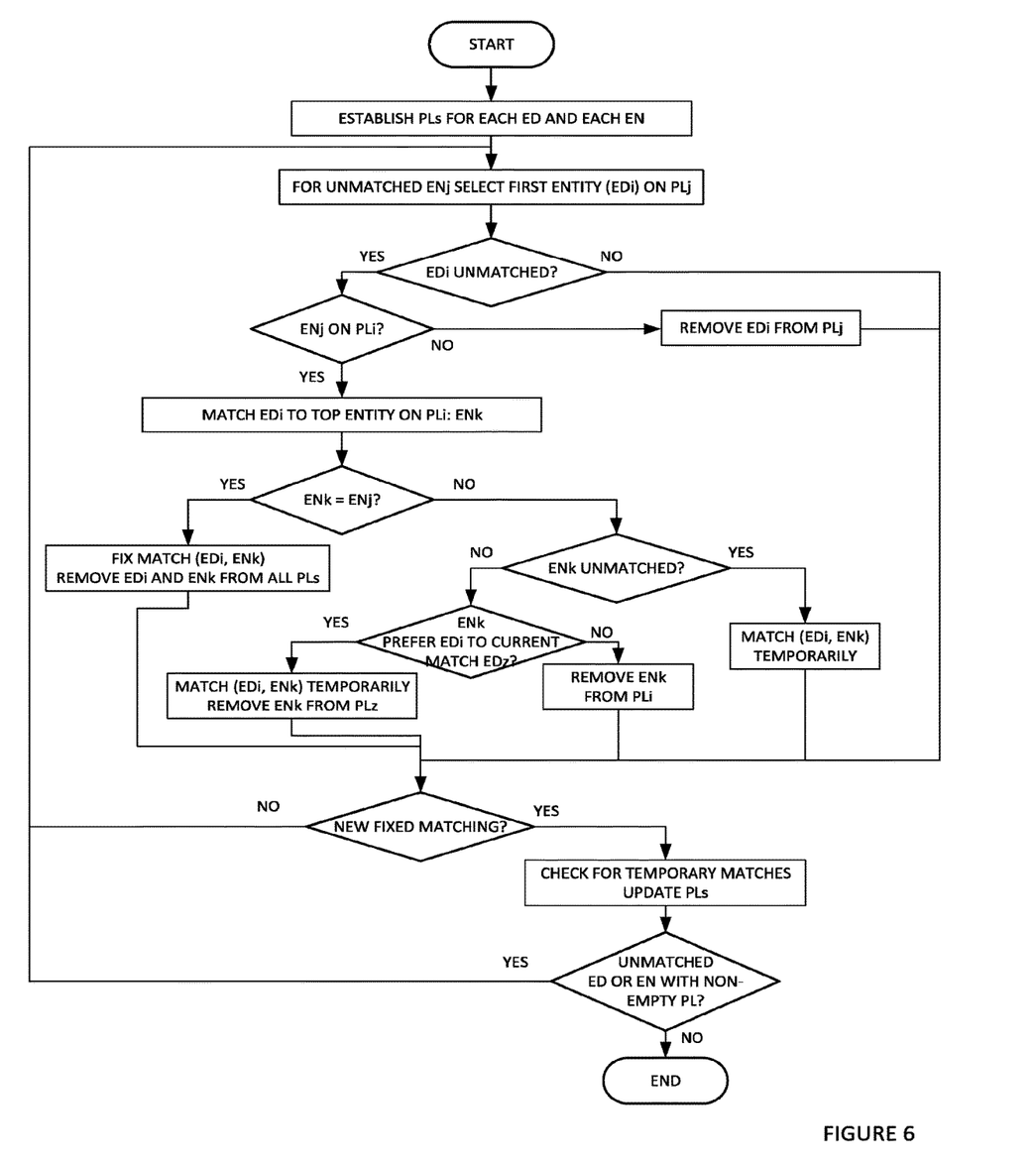
FIG. 6 is a flow diagram for a procedure for scheduling tasks to resources in the procedure of FIG. 5.

FIG. 6 illustrates a flow chart of the matching method of this embodiment using a virtual scheduler distributed across nodes using a data bus.

The matching method follows the operational procedure described below. Firstly, a preference list (PL) is established for every entity, namely the user end devices (ED) and the task computers edge nodes (EN). The PL is a ranking created for each entity of one side to represent its preference of the entities at the other side. The preference can be based on a variety of technical and non-technical parameters in combination. For example, the user's QoS requirement may be a factor, or the service price charged by the resource provider (the operator of the task computer). For example, it may be that one user prefers the edge computer that has the fastest processing capacity or has the lowest price tag. The decentralised schedulers 200 collect the user information for each user computer (ED) 100, generate the PL for the user computer (ED) 100, and synchronise among each other to obtain an overview of the network, as if the schedulers 200 were in fact a centrally deployed entity.

The schedulers 200 collect the requirement and preference criteria and generate PLs for the entities at the resource side, namely the task computers (EN) 300, as well.

All schedulers 200 have the same information as to the membership of all of the PLs. Then, every scheduler 200 can then conduct process matching individually without communicating (which can result in massive signalling overhead) with other schedulers. The outcome of matching will be the same throughout the whole network.

In a second stage of the process, for an unmatched resource $EN_j$, the scheduler 200 checks the first entity on its PL, $PL_j$. The first entity, $ED_i$, indicates the most preferable user/task for that particular resource. Then, the scheduler looks into the PLs of the corresponding users at the demand side and takes the following action.

For an unmatched user computer $ED_i$ on the preference list $PL_j$ the scheduler 200 examines the first task computer (resource) in the PL, $PL_i$, for the user computer. In other words, the user computers propose to their favourite resources.

As illustrated, if the PL for $ED_i$ does not have the originating task computer $EN_j$ on it, then $ED_i$ is removed from the preference list $PL_j$ for $EN_j$. This provides computational gain in that there is no point in $EN_j$ retaining any form of preference for $ED_i$ if the preference has no reciprocation at $ED_i$.

Then, a candidate match is made between $ED_i$ and the top entity in its PL, $PL_i$. This, for the purpose of this description, is named $EN_k$.

It is possible that the most favoured task computer $EN_k$ for $ED_i$ is in fact $EN_j$. That is, this is a perfect match, wherein the most favoured task computer for $ED_i$ does in fact also most favour user computer $ED_i$.

No other match will be preferred by either device, and so the matching is established and is deemed fixed. The scheduler will authorise the allocation to the user and resource and will then remove the matched entities from all other entities' PLs.

As the procedure is iterative, there will be temporary matches as a result of earlier iterations. These temporary matches are made with the knowledge that better matches may arise through iteration, before a match is considered sufficiently optimal that it can be fixed.

If the resource $EN_k$ has been temporarily matched to another user $ED_z$, the scheduler compares the potential user $ED_i$ with the existing matched user, $ED_z$. If the resource prefers the potential user (that is, it has a higher rank in $PL_k$), the scheduler 200 updates the matching: it temporarily matches the resource $EN_k$ to the new user $ED_i$, and deletes the resource from the PL for $ED_z$, $PL_z$ for the previously temporarily matched user $ED_z$. Otherwise the existing matching ($EN_k$, $ED_z$) remains.

If the resource $EN_k$ is unmatched, the resource will be temporarily matched to the user $ED_i$.

A round of matching is completed when the scheduler has considered all unmatched users once. A new round starts if there are still unmatched users.

During the matching process, whenever a fixed matching is established, the scheduler checks the temporarily matched pairs. Because fixing a matching means that users and resources will be removed from respective PLs, there is a possibility that temporarily matched pairs now can become fixed, as the temporarily matched entities become the most favourite to each other, among the remaining entities.

The process terminates when no unmatched user exists. When the process terminates, temporary matching is considered fixed, the scheduler authorises those connections.

After the matching, every scheduler can individually establish a data processing request that it is responsible for to the allocated resources. No conflict will be expected as the allocation is based on the same matching process at each scheduler, coordinated as it were one virtual entity.

This approach is able to ensure that the allocation result is stable, meaning that once the resources are allocated to tasks, such allocation can maintain for the whole duration of the processing period. One user (resource) would have no incentive to change to a different resource (user) for better utility (computing operation performance), measured by, for example, task processing delay, so that they would like to remain in the same allocation until the tasks are processed. By the described method, the resource is also allocated in an optimal way such that every computing task/user can obtain the best possible computational resource provided in the shared situation to process its requirement. Utility cannot be increased by a different resource allocation, without reducing the utility of other entities.

The implementation of a virtual entity of schedulers avoids the need of a centralised node to carry out the resource allocation. Moreover, the individual schedulers, acting on particular user requests, reduces the need to share information, such as 'proposals', ACKs, NAKs, among the users/schedulers during the matching negotiation process. Information exchange only happens in the initial stage of the process when establishing PLs.

Embodiments are described in the context of implementation of executable software being executed on suitably configured hardware. However, the reader will appreciate that other implementations are possible, including greater or complete reliance on application specific hardware devices. Further, while a software implementation may be achieved by execution of a software product on a hardware device, the reader will appreciate that a more distributed approach may be achievable, including obtaining software functionality from a remote location such as a "cloud based" service.

Where reference is made to particular hardware components, the reader will appreciate that they may be implemented in different order without altering the general principles conveyed by the present disclosure.

The embodiments described above are intended to be indicative, and are not limiting on the scope of protection sought, which should be determined on the basis of the claims appended hereto.

The invention claimed is:

1. A method implemented by a computer network comprising a plurality of requesting computers configured to request tasks to be performed, and a plurality of processing computers configured to perform requested tasks, and a scheduling entity in communication with each of the plurality of requesting computers and each of the plurality of processing computers, the scheduling entity comprising a plurality of schedulers, each scheduler being associated with one of the plurality of requesting computers and one of the plurality of processing computers, the method comprising:

for each requesting computer of the plurality of requesting computers, establishing a first priority list, each first priority list being a list of the plurality of processing computers in an order of preference for a respective requesting computer, wherein the tasks requested by the plurality of requesting computers are to be matched;

for each processing computer of the plurality of processing computers, establishing a second priority list, each second priority list being a list of the plurality of requesting computers in an order of preference for a respective processing computer, wherein the plurality of schedulers generate each first priority list and each second priority list;

for a first unmatched processing computer of the plurality of processing computers:
identifying a first requesting computer being a highest preference requesting computer on the second priority list for a first processing computer;
if the first requesting computer is not matched to a processing computer:
if the first processing computer is not on the first priority list for the first requesting computer, then removing the first requesting computer from the second priority list for the first processing computer;
if the first processing computer is on the first priority list for the first requesting computer, then:
matching the first requesting computer to a second processing computer, the second processing computer being a highest preference processing computer on the first priority list for the first requesting computer;
if the second processing computer is the first processing computer, then fixing a match between the first requesting computer and the first processing computer;
else if the second processing computer is unmatched, temporarily matching the second processing computer with the first requesting computer while, if the second processing computer is matched to a second requesting computer, if the first requesting computer has higher preference on the second priority list for the second processing computer than the second requesting computer, temporarily matching the second processing computer to the first requesting computer and removing the second processing computer from the first priority list for the second requesting computer;
if preceding steps result in a new fixed matching, then revising the first priority lists for the plurality of requesting computers and the second priority lists for the plurality of processing computers and reiterating the preceding steps until all requesting computers are matched.

2. The method in accordance with claim 1 wherein the plurality of schedulers establish a virtual bus between the plurality of schedulers to cause formation of the scheduling entity.

3. A computer network comprising a plurality of requesting computers configured to request tasks to be performed, and a plurality of processing computers configured to perform requested tasks, and a scheduling entity in communication with each of the plurality of requesting computers and each of the plurality of processing computers, the scheduling entity being configured to:
  for each requesting computer of the plurality of requesting computers, establish a priority list, each priority list being a list of the plurality of processing computers in an order of preference for a respective requesting computer;
  for each processing computer of the plurality of processing computers, establish a priority list, each priority list being a list of the plurality of requesting computers in an order of preference for a respective processing computer;
  for a first unmatched processing computer of the plurality of processing computers:
    identify a first requesting computer being a highest preference requesting computer on the priority list for a first processing computer;
    if the first requesting computer is not matched to a processing computer:
      if the first processing computer is not on the priority list for the first requesting computer, then remove the first requesting computer from the priority list for the first processing computer;
      if the first processing computer is on the priority list for the first requesting computer, then:
        match the first requesting computer to a second processing computer, the second processing computer being a highest preference computer on the priority list for the first requesting computer;
        if the second processing computer is the first processing computer, then fix a match between the first requesting computer and the first processing computer;
        else if the second processing computer is unmatched, temporarily match the second processing computer with the first requesting computer while, if the second processing computer is already matched to a second requesting computer, if the first requesting computer has higher preference on the priority list for the second processing computer than the second requesting computer, temporarily match the second processing computer to the first requesting computer and remove the second processing computer from the priority list for the second requesting computer;
  if preceding functionalities result in a new fixed matching, then to revise the priority lists for the plurality of requesting computers and the priority lists for the plurality of processing computers and reiterate the preceding functionalities until all requesting computers are matched.

4. A scheduling entity for scheduling tasks, each task being requested by one of a plurality of requesting computers, each task to be performed by one of a plurality of processing computers, the scheduling entity being part of a computer network comprising the plurality of requesting computers configured to request tasks to be performed, and the plurality of processing computers configured to perform requested tasks, and the scheduling entity being in communication with each of the plurality of requesting computers and each of the plurality of processing computers and being configured to:
  for each requesting computer of the plurality of requesting computers, establish a priority list, each priority list being a list of the plurality of processing computers in an order of preference for a respective requesting computer;
  for each processing computer of the plurality of processing computers, establish a priority list, each priority list being a list of the plurality of requesting computers in an order of preference for a respective processing computer;
  for a first unmatched processing computer of the plurality of processing computers:
    identify a first requesting computer being a highest preference requesting computer on the priority list for a first processing computer;
    if the first requesting computer is not matched to a processing computer:
      if the first processing computer is not on the priority list for the first requesting computer, then remove the first requesting computer from the priority list for the first processing computer;
      if the first processing computer is on the priority list for the first requesting computer, then:
        match the first requesting computer to a second processing computer, the second processing computer being a highest preference computer on the priority list for the first requesting computer;
        if the second processing computer is the first processing computer, then fix a match between the first requesting computer and the first processing computer;
        else if the second processing computer is unmatched, temporarily match the second processing computer with the first requesting computer while, if the second processing computer is already matched to a second requesting computer, if the first requesting computer has higher preference on the priority list for the second processing computer than the second requesting computer, temporarily match the second processing computer to the first requesting computer and remove the second processing computer from the priority list for the second requesting computer;
  if preceding functionalities result in a new fixed matching, then to revise the priority lists for the plurality of requesting computers and the priority lists for the plurality of processing computers and reiterate the preceding functionalities until all requesting computers are matched.

5. The scheduling entity in accordance with claim 4, the scheduling entity comprising a plurality of schedulers, each scheduler being associated with one of the plurality of requesting computers and one of the plurality of processing computers, the plurality of schedulers being operable to establish a virtual bus between the plurality of schedulers to cause formation of the scheduling entity.

6. A non-transitory computer readable medium having stored thereon software instructions that, when executed by a processor, cause the processor to act as a scheduling entity for scheduling tasks, each task being requested by one of a plurality of requesting computers, each task to be performed by one of a plurality of processing computers, the scheduling entity being part of a computer network comprising the plurality of requesting computers configured to request tasks to be performed, and the plurality of processing computers configured to perform requested tasks, and the scheduling entity being in communication with each of the plurality of requesting computers and each of the plurality of processing computers and being configured to match tasks requested by the plurality of requesting computers, to be performed by the plurality of processing computers, by executing steps comprising:

for each requesting computer of the plurality of requesting computers, establishing a priority list, each priority list being a list of the plurality of processing computers in an order of preference for a respective requesting computer;

for each processing computer of the plurality of processing computers, establishing a priority list, each priority list being a list of the plurality of requesting computers in an order of preference for a respective processing computer;

for a first unmatched processing computer of the plurality of processing computers:

identifying a first requesting computer being a highest preference requesting computer on the priority list for a first processing computer;

if the first requesting computer is not matched to a processing computer:

if the first processing computer is not on the priority list for the first requesting computer, then removing the first requesting computer from the priority list for the first processing computer;

if the first processing computer is on the priority list for the first requesting computer, then:

matching the first requesting computer to a second processing computer, the second processing computer being a highest preference computer on the priority list for the first requesting computer;

if the second processing computer is the first processing computer, then fixing a match between the first requesting computer and the first processing computer;

else if the second processing computer is unmatched, temporarily matching the second processing computer with the first requesting computer while, if the second processing computer is already matched to a second requesting computer, if the first requesting computer has higher preference on the priority list for the second processing computer than the second requesting computer, temporarily matching the second processing computer to the first requesting computer and removing the second processing computer from the priority list for the second requesting computer;

if preceding steps result in a new fixed matching, then revising the priority lists for the plurality of requesting computers and the priority lists for the plurality of processing computers and reiterating the preceding steps until all requesting computers are matched.

* * * * *